(12) United States Patent
Mauritz (10) Patent No.: US 10,694,542 B2
(45) Date of Patent: Jun. 23, 2020

(54) CLASSIFICATION OF USER EQUIPMENT USING EXTENDED SET OF RANDOM ACCESS PREAMBLES

(71) Applicant: TELEFONAKTIEBOLAGET L M ERICSSON (PUBL), Stockholm (SE)

(72) Inventor: Oskar Mauritz, Johanneshov (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/083,821

(22) PCT Filed: Mar. 11, 2016

(86) PCT No.: PCT/SE2016/050195
§ 371 (c)(1),
(2) Date: Sep. 10, 2018

(87) PCT Pub. No.: WO2017/155438
PCT Pub. Date: Sep. 14, 2017

(65) Prior Publication Data
US 2019/0075593 A1    Mar. 7, 2019

(51) Int. Cl.
*H04W 74/02*    (2009.01)
*H04W 74/08*    (2009.01)
*H04J 13/00*    (2011.01)
*H04W 74/00*    (2009.01)

(52) U.S. Cl.
CPC ......... *H04W 74/02* (2013.01); *H04J 13/0062* (2013.01); *H04W 74/008* (2013.01); *H04W 74/085* (2013.01); *H04W 74/0833* (2013.01)

(58) Field of Classification Search
CPC ............. H04W 74/004; H04W 74/008; H04W 74/0833; H04L 23/02
See application file for complete search history.

(56) References Cited

U.S. PATENT DOCUMENTS

| 2015/0078264 A1 | 3/2015 | Han et al. |
| 2017/0019931 A1* | 1/2017 | Su ..................... H04W 74/0833 |
| 2017/0094686 A1* | 3/2017 | Ramamurthi ..... H04W 72/0406 |

FOREIGN PATENT DOCUMENTS

| WO | 2014205723 A1 | 12/2014 |
| WO | 2015071025 A1 | 5/2015 |

OTHER PUBLICATIONS

Liu et al., "A Preamble Allocation Method for M2M Traffics in 3GPP LTE-A networks", 2015 Seventh International Workshop on Signal Design and Its Applications in Communications (IWSDA), IEEE, Sep. 14, 2015, p. 180-185.

(Continued)

*Primary Examiner* — Pao Sinkantarakorn
(74) *Attorney, Agent, or Firm* — Sage Patent Group (57) ABSTRACT

A random access process may be performed with an extended set of random access preambles comprising a standard set and at least one additional set. The use of a preamble from the standard set or the additional set may be used to indicate whether a wireless communication device belongs to a standard class or a non-standard class, allowing a radio access node to provide special treatment to the non-standard class in a random access response.

25 Claims, 10 Drawing Sheets

(56) References Cited

OTHER PUBLICATIONS

ETSI, "LTE; Evolved Universal Terrestrial Radio Access (E-UTRA); Medium Access Control (MAC); protocol specification" 3GPP TS 36.321 version 12.4.0 Release 12, Feb. 2015, Section 6.2.1, pp. 48-49.
ETSI, "LTE; Evolved Universal Terrestrial Radio Access (E-UTRA); Radio Resource Control (RRC); protocol specification" 3GPP TS 36.331 version 12.4.1 Release 12, Feb. 2015, sections 5.6.3, 6.2.2, and 6.3.6, pp. 118-120, 147-195, and 311-337.
3GPP TR 36.888, "3rd Generation Partnership Project; Technical Specification Group Radio Access Network; Study on provision of low-cost Machine-Type Communications (MTC) User Equipments (UEs) based on LTE", Jun. 2013, v 12.0.0, sections 6.2.2.4 and 9.5.3, pp. 20-21, and 46.
3GPP TSG RAN WG1 Meeting #80, "LS on PRACH coverage enhancement", R1-150920, Feb. 9-13, 2015.
ETSI, "LTE; Evolved Universal Terrestrial Radio Access (E-Utra); Physical channels and modulation", 3GPP TS 36.211,v 12.4.0, Release 12, Feb. 2015, section 5.7, pp. 46-55.

* cited by examiner

CLASSIFICATION OF USER EQUIPMENT USING EXTENDED SET OF RANDOM ACCESS PREAMBLES

RELATED APPLICATIONS

This application is a national stage application of International Patent Application No. PCT/SE2016/050195, filed Mar. 11, 2016, the disclosure of which is hereby incorporated herein by reference in its entirety.

TECHNICAL FIELD

The disclosed subject matter relates generally to telecommunications and more particularly to techniques and technologies for classification of user equipment using an extended set of random access preambles.

BACKGROUND

In Evolved Universal Terrestrial Radio Access (E-UTRA), a user equipment (UE) requests connection setup through a process referred to as random access. The UE initiates this process by transmitting a random access preamble to an eNodeB (eNB) via a physical random access channel (PRACH). In some circumstances, such as so-called "contention-free" random access, the transmitted preamble may be assigned by the network. Alternatively, in other circumstances such as so-called "contention-based" random access, the transmitted preamble may be randomly selected by the UE from one of multiple possible groups of preambles (e.g. preamble groups A and B).

In contention-based random access, selection of a preamble from a particular group may be used to convey information about the amount of data the UE desires to transmit in subsequent transmissions. For example, selection of a preamble from group A may indicate that the UE desires to transmit a relatively low amount of data, while selection of a preamble from group B may indicate that the UE desires to transmit a relatively high amount of data, or vice versa.

Once a preamble has been transmitted by the UE and detected by the eNB, the eNB transmits a Random Access Response to the UE on a downlink shared channel (DL-SCH). Thereafter, the UE transmits an RRC connection request message to the eNB on an uplink shared channel (UL-SCH). The UE and eNB then communicate using the RRC protocol to establish a connection for data transport between the UE and the network.

Once the UE is connected to the eNB, the eNB facilitates data transport between the UE and the network. In general, the data transport performance may be limited by the radio access capability of the UE, which may be indicated by a UE classification or some other mechanism. Different types of UEs, for instance, may have different radio access capabilities as defined in 3GPP TS 36.306, such as number of receive antennas, maximum number of layers for uplink transmission, maximum data rates in uplink and downlink.

The eNB generally needs to know the UE capabilities in order to properly assign resources, perform control functions, and conduct communication with the UE, among other things. The eNB may obtain information regarding UE capability in any of several ways.

In a typical approach employed in E-UTRA, for example, a UE conveys its capability to the eNB in an RRC UECapabilityInformation message as defined in 3GPP TS 36.331. This information is typically sent upon request from the eNB, after an RRC connection is established.

In an alternative approach, a Category 0 UE, as defined in 3GPP TS 36.306, has restrictions on transport block size, which requires UE capability to be known by the eNB before the RRC connection is established. A Category 0 UE therefore signals its category in the random access procedure, more specifically using a particular logical channel identifier (LCD) in Random Access Msg 3, as defined in 3GPP TS 36.321.

In yet another alternative approach, an even earlier communication of UE capability is proposed. For 3GPP Rel-13, a coverage-limited UE can convey its so-called PRACH repetition level by the random access preamble that it transmits, as described in 3GPP TR 36.888 and 3GPP Tdoc R1-150920. In other words, the UE capability can be identified based on the initial transmission of the random access preamble. To that end the preambles in a cell are partitioned into more groups than preamble groups A and B and the group of preambles for contention-free random access. The network can then apply relevant coverage-enhancement schemes already from the random access response. Coverage-limited UEs may repeatedly transmit the same preamble in several PRACH both to be detected and to be classified by the eNB.

SUMMARY

In the future, even more classes of UEs may appear that require special handling, not confined to coverage enhancement, in the eNB from random access response and onwards. Such classes may also include non-standard UEs. For a UE that needs such special handling, UE classification or capability must be transmitted on PRACH. In existing approaches, classification of repetition level and Random Access Msg 3 payload, as well as identification of individual UEs, using contention-free random access, can be made based on the received preamble. However, because the total number of preambles in a cell is limited to 64, as discussed in 3GPP TS 36.211, and because 3GPP Rel-13 may specify a large set of different preamble groups for contention-free random access, contention-based random access and for up to three different PRACH repetition levels, further partitioning of the preambles may increase the risk of contention on PRACH beyond what is desirable or even acceptable.

In recognition of at least the above limitations of conventional approaches, the disclosed subject matter presents certain embodiments in which additional sets of preambles are generated from cyclic shifts of root sequences to extend the set of UE classes that can be identified before the random access response. An additional set of preambles is used to identify a non-standard UE class.

In certain embodiments, a method of operating a radio access node comprises receiving a random access preamble from a wireless communication device, determining whether the received random access preamble belongs to a standard set of random access preambles or an additional set of random access preambles, wherein the standard set corresponds to at least one standard class of wireless communication device and the additional set corresponds to at least one non-standard class of wireless communication device, and in response to determining that the random access preamble belongs to the additional set of random access preambles, identifying the wireless communication device as belonging to a non-standard class of wireless communication device, and transmitting information to the wireless communication device based on the non-standard class identification.

In certain embodiments, a radio access node comprises a memory, a receiver configured to receive a random access preamble from a wireless communication device, at least one processor coupled to the at least one memory, and at least one transmitter. The at least one processor is configured to determine whether the received random access preamble belongs to a standard set of random access preambles or an additional set of random access preambles, wherein the standard set corresponds to at least one standard class of wireless communication device and the additional set corresponds to at least one non-standard class of wireless communication device, and in response to determining that the random access preamble belongs to the additional set of random access preambles, identify the wireless communication device as belonging to a non-standard class of wireless communication device. The transmitter is configured to transmit information to the wireless communication device based on the non-standard class identification.

In certain embodiments, a method of operating a wireless communication device in a wireless communication network comprises identifying at least one root sequence based on information broadcast by a radio access node, generating a random access preamble based on the at least one root sequence, wherein the random access preamble is selected from an additional set of random access preambles within an extended set of random access preambles, the extended set comprising a standard set of random access preambles that corresponds to at least one standard class of wireless communication device, and further comprising the additional set, which corresponds to at least one non-standard class of wireless communication device, and wherein the standard set and the additional set are both defined in relation to the at least one root sequence, and transmitting the random access preamble to the radio access node.

In certain embodiments, a wireless communication device comprises a memory, at least one processor coupled to the memory, and a transmitter. The at least one processor is configured to identify at least one root sequence based on information broadcast by a radio access node, and generate a random access preamble based on the at least one root sequence, wherein the random access preamble is selected from an additional set of random access preambles within an extended set of random access preambles, the extended set comprising a standard set of random access preambles that corresponds to at least one standard class of wireless communication device, and further comprising the additional set, which corresponds to at least one non-standard class of wireless communication device, and wherein the standard set and the additional set are both defined in relation to the at least one root sequence. The at least one transmitter is configured to transmit the random access preamble to the radio access node.

BRIEF DESCRIPTION OF THE DRAWINGS

The drawings illustrate selected embodiments of the disclosed subject matter. In the drawings, like reference labels denote like features.

DETAILED DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

In certain embodiments described below, additional sets of preambles generated from cyclic shifts of root sequences are defined to extend the set of UE classes that can be identified before the random access response. An additional set of preambles is used to identify a non-standard UE class. Certain examples of standard UE classes are defined in 3GPP TS 36.306, such as UE Category 1, UE Category 5 and UE Category DL M1. UE Category 1 does not support spatial multiplexing in downlink, and it can receive at most 10296 bits in a transmission time interval (TTI). UE Category 5 supports four-layer spatial multiplexing in downlink and can receive up to 299552 bits in a TTI. UE Category DL M1, proposed in 3GPP Tdoc R2-157139, does not support spatial multiplexing in downlink, can receive at most 1000 bits in a TTI, has a maximum UE channel bandwidth of 6 Physical Resource Blocks (PRBs), and supports half-duplex FDD Type B. In comparison, a non-standard UE class may have limited duty cycle for uplink transmissions or coverage enhancement requirements other than those defined in the 3GPP specification, for example.

These and other embodiments may potentially extend the set of UE classes that can receive special treatment in the random access response without reserving further sets of existing preambles for UE classification, thus avoiding increased risk of contention on PRACH. Such special treatment may include, for instance, repetition or power boosting of random access response for increased coverage, or additional content in the random access response, e.g. non-standard MAC Control elements to improve signaling or data transmission.

The described embodiments may be implemented in any appropriate type of communication system supporting any suitable communication standards and using any suitable components. As one example, certain embodiments may be implemented in an LTE network, such as that illustrated in FIG. 1.

Figure 1:
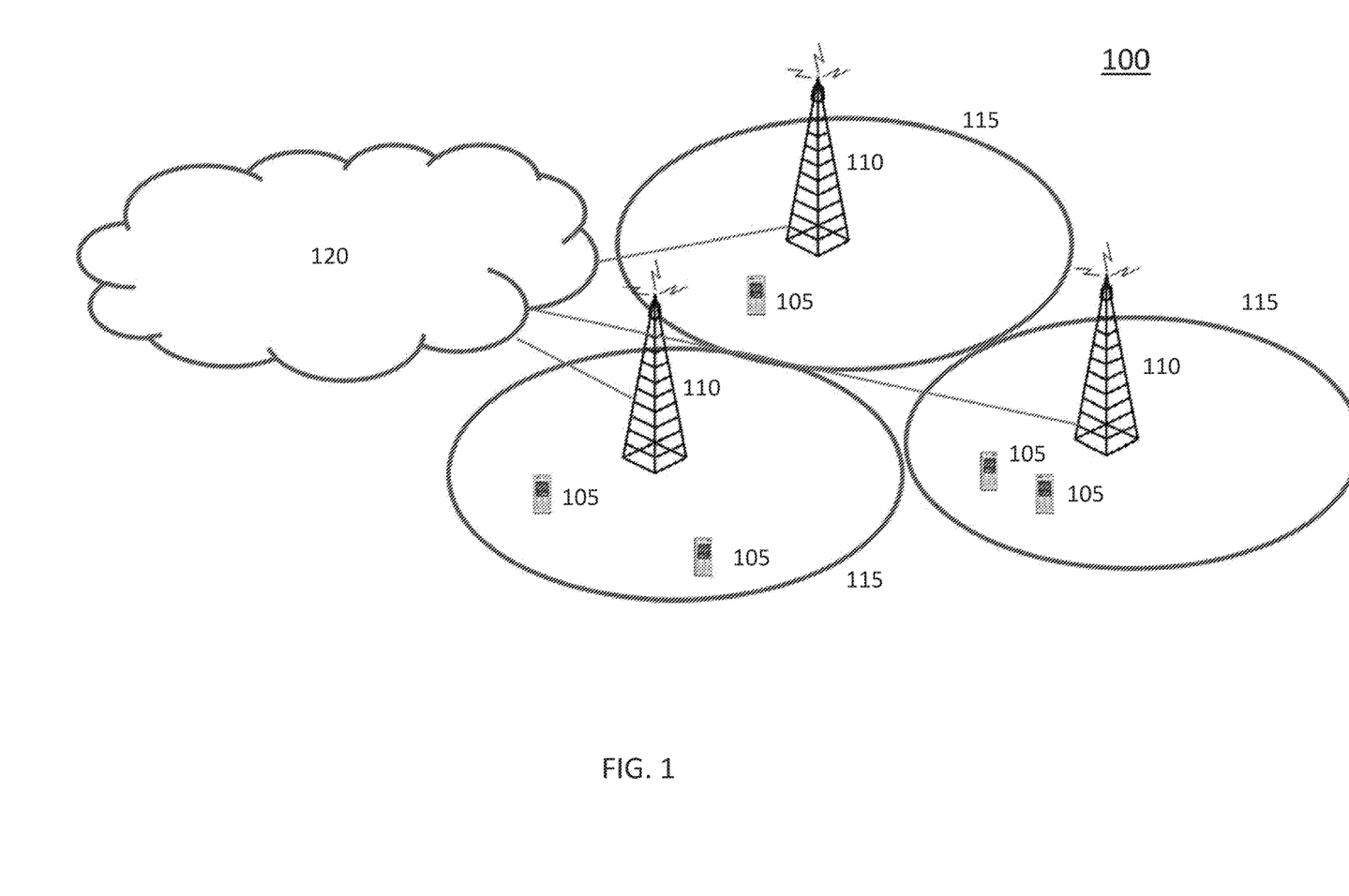
FIG. 1 is a diagram illustrating an LTE network according to an embodiment of the disclosed subject matter.

Referring to FIG. 1, a communication network 100 comprises a plurality of wireless communication devices 105 (e.g., conventional UEs, machine type communication [MTC]/machine-to-machine [M2M] UEs) and a plurality of radio access nodes 110 (e.g., eNodeBs or other base stations). Communication network 100 is organized into cells 115, which are connected to a core network 120 via corresponding to radio access nodes 110. Radio access nodes 110 are capable of communicating with wireless communication devices 105 along with any additional elements suitable to support communication between wireless communication devices or between a wireless communication device and another communication device (such as a landline telephone).

Figure 2:
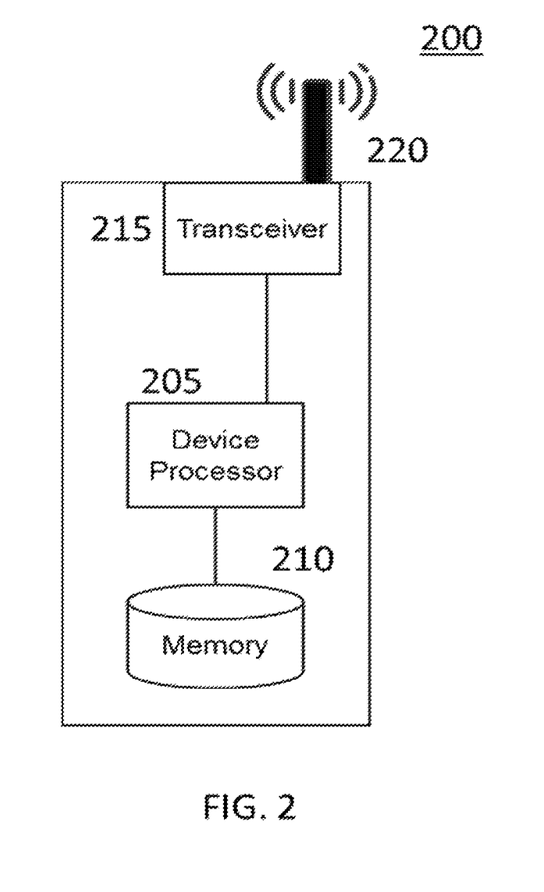
FIG. 2 is a diagram illustrating a wireless communication device according to an embodiment of the disclosed subject matter.

Although wireless communication devices 105 may represent communication devices that include any suitable combination of hardware and/or software, these wireless communication devices may, in certain embodiments, represent devices such as an example wireless communication device illustrated in greater detail by FIG. 2. Similarly, although the illustrated radio access node may represent network nodes that include any suitable combination of hardware and/or software, these nodes may, in particular embodiments, represent devices such as the example radio access node illustrated in greater detail by FIG. 3.

Referring to FIG. 2, a wireless communication device 200 comprises a processor 205, a memory, a transceiver 215, and an antenna 220. In certain embodiments, some or all of the functionality described as being provided by UEs, MTC or M2M devices, and/or any other types of wireless communication devices may be provided by the device processor executing instructions stored on a computer-readable medium, such as the memory shown in FIG. 2. Alternative embodiments may include additional components beyond those shown in FIG. 2 that may be responsible for providing certain aspects of the device's functionality, including any of the functionality described herein.

Figure 3:
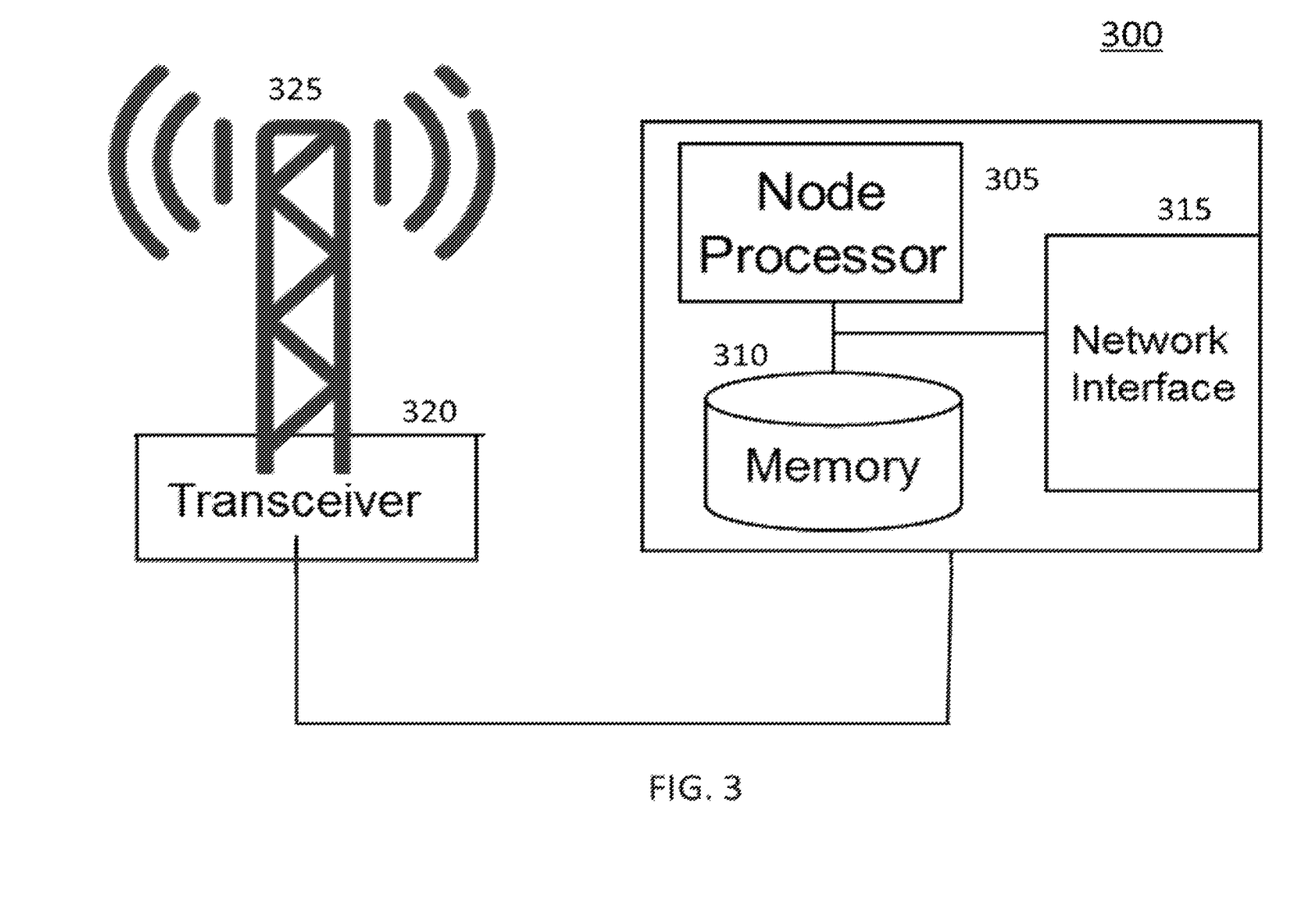
FIG. 3 is a diagram illustrating a radio access node according to an embodiment of the disclosed subject matter.

Referring to FIG. 3, a radio access node 300 comprises a node processor 305, a memory 310, a network interface 315, a transceiver 320, and an antenna 325. In certain embodiments, some or all of the functionality described as being provided by a base station, a node B, an eNB, and/or any other type of network node may be provided by node processor 305 executing instructions stored on a computer-readable medium, such as memory 310 shown in FIG. 3. Alternative embodiments of radio access node 300 may comprise additional components to provide additional functionality, such as the functionality described herein and/or related supporting functionality.

Figure 4:
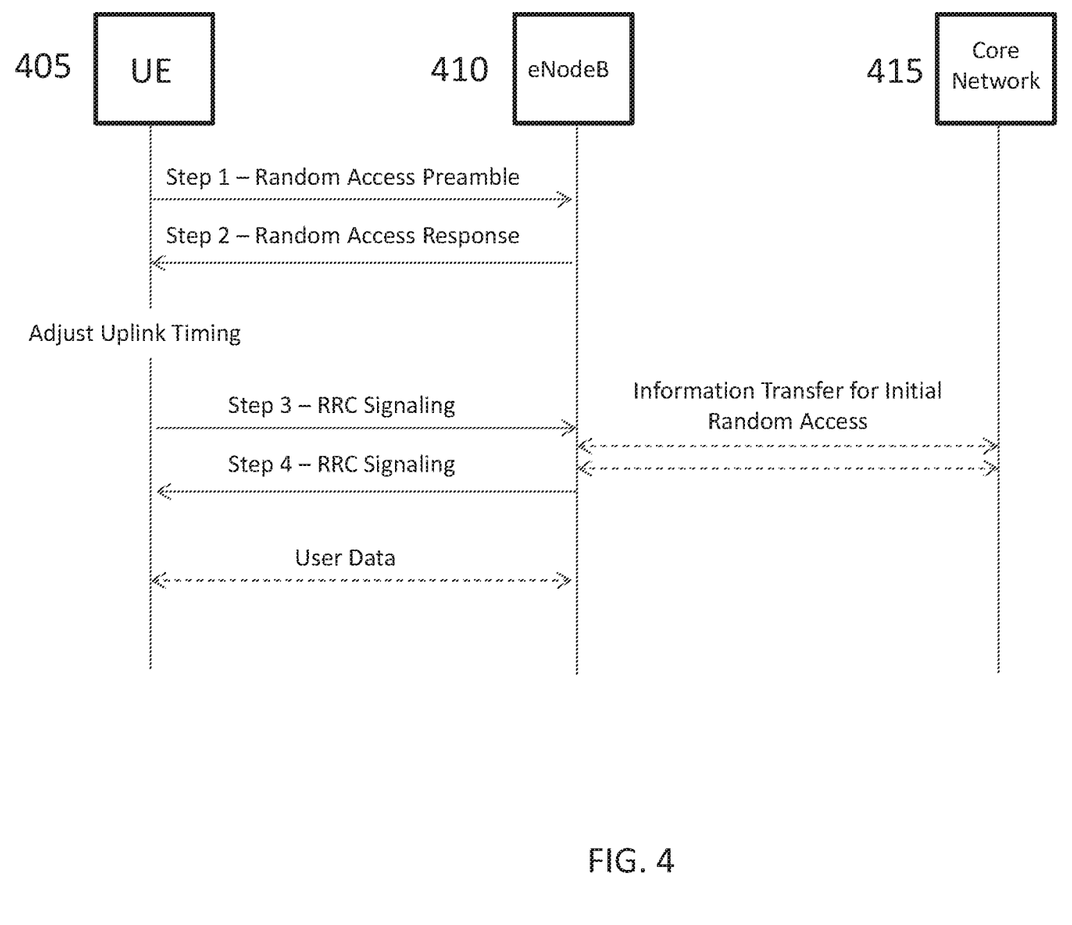
FIG. 4 is a diagram illustrating a random access process according to an embodiment of the disclosed subject matter.

Certain embodiments may be implemented in the context of a random access process such as that illustrated in FIG. 4. As illustrated in FIG. 4, the random access process comprises Steps 1-4 in which a UE 405 establishes a connection with an eNB 410. In the case of initial random access (i.e., where the UE is not already identified to the eNB), the random access process may further comprise information transfer from the eNB 410 to a core network 415. Notably, the random access process of FIG. 4 is a contention-based random access process. In a contention-free random access process, Steps 3-4 may be omitted and Steps 1-2 may be modified. Various additional aspects described and illustrated in relation to FIG. 4 may be modified, omitted, or expanded upon, as will be apparent to those skilled in the art. For example, the order of certain operations may be changed, or certain operations may be performed by signaling that differs from that described or illustrated in relation to FIG. 4.

In Step 1, UE 405 transmits a random access preamble to eNB 410. Among other things, the transmission of the random-access preamble allows eNB 410 to estimate the transmission timing of UE 405 for uplink synchronization, and it also allows eNB 410 to determine the classification of UE 410.

As described in further detail below, the random access preamble may be selected from a particular subgroup of the possible random access preambles, or from an extended set of random access preambles, depending on the UE classification. For instance, if UE 405 is a non-standard UE, the random access preamble may be selected from a range of preambles that extends beyond the range used for standard UEs.

UE 405 may select the random access preamble by first identifying a root index broadcasted by eNB 410, determining a root sequence based on the root index, and then applying cyclic shifts to the root sequence to produce a desired random access preamble. Upon receiving the transmitted random access preamble, eNB 410 may determine the classification for UE 405 based on whether the random access preamble was selected from the range used for standard UEs, or from an extended range. Then, based on that determination, eNB 410 may adjust future transmissions, e.g., by transmitting particular information to UE 405 or allocating particular resources to UE 405 according to the classification.

In Step 2, eNB 410 transmits a random access response to UE 405. The response typically includes a timing advance command to adjust the transmission timing of UE 405, based on the timing estimate obtained in Step 1. In addition, Step 2 also assigns uplink resources to UE 405 to be used in Step 3. The assignment of uplink resources may be determined, at least in part, by the classification of UE 405.

In Step 3, UE 405 transmits a mobile-terminal identity to eNB 410 using UL-SCH similar to normal scheduled data. The content of the signaling generally depends on the state of the UE 405, such as whether it is already known to the network. Then, in Step 4, eNB 410 transmits a contention resolution message to UE 405 on DL-SCH. Thereafter, UE 405 and eNB 410 may exchange data as illustrated by a dotted two-way arrow.

Figure 5:
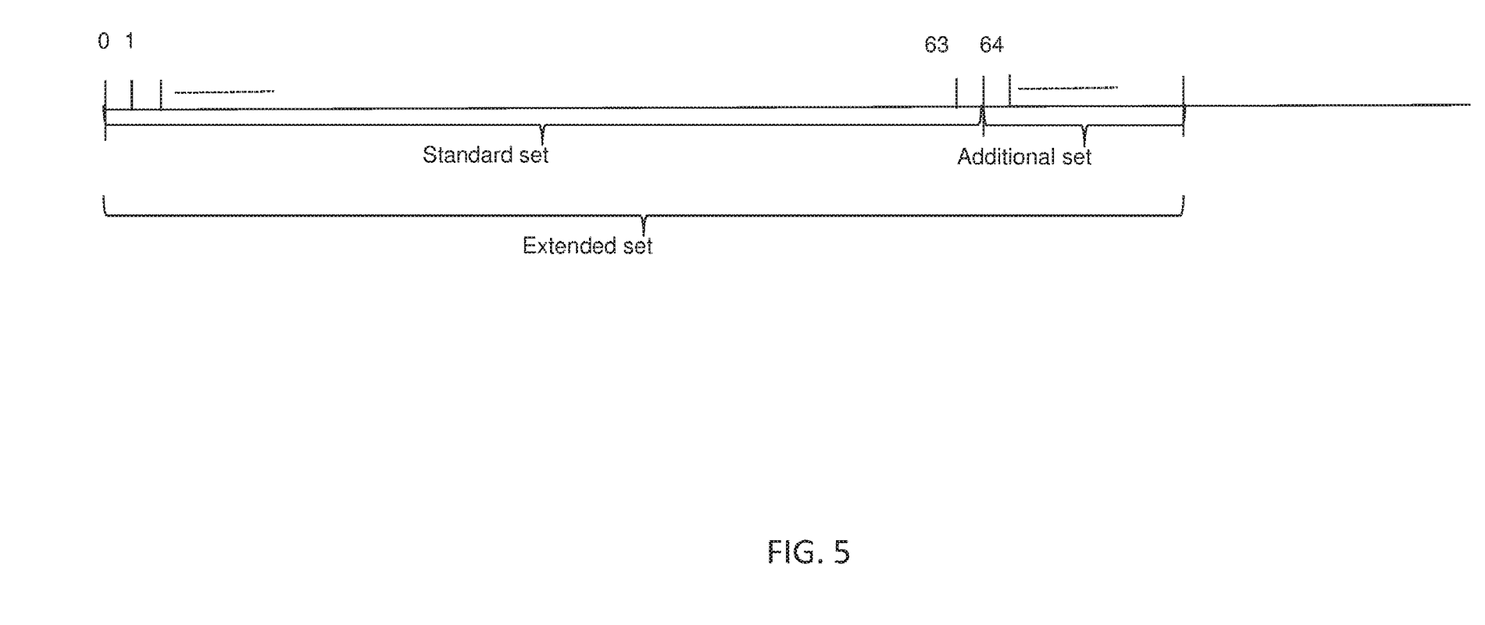
FIG. 5 is a diagram illustrating an extended set of random access preambles according to an embodiment of the disclosed subject matter.

FIG. 5 is a diagram illustrating an extended set of random access preambles according to an embodiment of the disclosed subject matter. As illustrated in FIG. 5, the extended set comprises a "standard set" of preambles, labeled 0-63, and an "additional set" of preambles, which may vary in number according to the number of root sequences and cyclic shifts used to generate them.

In conventional E-UTRA, 64 random access preambles are generated from root sequences by using cyclic shifts. In case of unrestricted set of cyclic shifts, the number of preambles generated per root sequence depends only on the $N_{CS}$ value, which defines the minimum cyclic shift. The cyclic shifts used for preamble sequence generation are multiples of $N_{CS}$. Specifically, the available number of cyclic shifts per root sequence for preamble generation, $N_{pre}$, is defined according to the following Equation (1).

$$N_{pre} = \begin{cases} \left\lfloor \frac{N_{ZC}}{N_{CS}} \right\rfloor, & N_{CS} > 0 \\ 1, & N_{CS} = 0 \end{cases} \quad (1)$$

In Equation (1), $N_{ZC}$ represents the number of samples in the preamble sequence and the function $\lfloor x \rfloor$ denotes the largest integer less than or equal to x. For E-UTRA PRACH format 0 to 3, $N_{ZC}=839$. In each cell, as many preambles as possible are generated through the possible cyclic shifts in a first root sequence. If less than 64 preambles have been generated, new preambles are generated from the next root sequences, one by one, in the same way until 64 preambles have been generated. The number of root sequence required to obtain 64 preambles, $N_{root}$, is defined according to the following Equation (2).

$$N_{root} = \left\lceil \frac{64}{N_{pre}} \right\rceil$$

In Equation (2), the function $\lceil x \rceil$ denotes the smallest integer greater than or equal to x. The values of $N_{CS}$, $N_{pre}$ and $N_{root}$ are listed in Table 1.

TABLE 1

| zeroCorrelationZoneConfig | $N_{CS}$ value | Number of cyclic shifts per root sequence $N_{pre}$ | Number of required root sequences $N_{root}$ |
|---|---|---|---|
| 0 | 0 | 1 | 64 |
| 1 | 13 | 64 | 1 |
| 2 | 15 | 55 | 2 |
| 3 | 18 | 46 | 2 |
| 4 | 22 | 38 | 2 |
| 5 | 26 | 32 | 2 |
| 6 | 32 | 26 | 3 |
| 7 | 38 | 22 | 3 |
| 8 | 46 | 18 | 4 |
| 9 | 59 | 14 | 5 |
| 10 | 76 | 11 | 6 |
| 11 | 93 | 9 | 8 |
| 12 | 119 | 7 | 10 |
| 13 | 167 | 5 | 13 |
| 14 | 279 | 3 | 22 |
| 15 | 419 | 2 | 32 |

In an E-UTRA network each cell is allocated a set of $N_{root}$ consecutive root sequences for random access. Furthermore a cell applies a PRACH configuration, which specifies at what time instants and on what frequency a UE is allowed to transmit its random access preamble to that specific cell.

A UE preamble transmission may reach eNB receivers for several cells. Consider a pair of cells such that a UE preamble transmission could be detected in both cells if both cells receive PRACH at the same time instant, on the same frequency, and for the same root sequence. To reduce the risk of preamble false detection, the cells of the network should be planned in such a way that such pairs of cells differ in at least one of the following: time instant for PRACH, frequency for PRACH transmission, root sequences. More specifically, the sets of root sequences in the two cells of the pairs should be non-overlapping.

Certain embodiments of the disclosed subject matter extend the set of preambles in a cell so that more than 64 preambles are available in the cell. The first 64 preambles from index 0 to index 63 are denoted the standard set of preambles, and the remaining preambles from index 64 and higher are denoted the additional set of preambles, as shown in FIG. 5. The extended set is defined as the union of the standard set and the additional set.

A UE of a particular non-standard UE class transmits a preamble from the additional set of preambles. For example, if the extended set of preambles comprises 70 preambles, the additional set of preambles comprises the preambles ranging from 64 to 69. A UE of the particular non-standard UE class then transmits any preamble in the range 64 to 69.

The eNB attempts to detect all preambles in the extended set of preambles and upon successful detection of the preamble identifies the UE to belong to a particular non-standard UE class.

Although FIG. 5 illustrates a single "additional set", several classes of UEs may be identified by defining more than one additional set of preambles.

In some embodiments, the additional set of preambles may be the same regardless the value of $N_{CS}$. Alternatively, the additional set of preambles may depend on $N_{CS}$. For example, the additional set of preambles may be the ones generated by the unused cyclic shifts in the last root sequence as described below.

If 64 is not divisible by $N_{pre}$, only part of the cyclic shifts in the last root sequence will be used to generate preambles. More precisely, the number of unused cyclic shifts, $N_u$, in the last root sequence of a cell is defined according to the following Equation (3).

$$N_u(N_{CS}) = 64 \bmod N_{pre}(N_{CS}) \quad (3)$$

Table 2 below lists the value of unused cyclic shifts in the last root sequence.

TABLE 2

| zeroCorrelationZoneConfig | $N_{CS}$ value | $N_u$ |
|---|---|---|
| 0 | 0 | 0 |
| 1 | 13 | 0 |
| 2 | 15 | 9 |
| 3 | 18 | 18 |
| 4 | 22 | 26 |
| 5 | 26 | 0 |
| 6 | 32 | 12 |
| 7 | 38 | 20 |
| 8 | 46 | 10 |
| 9 | 59 | 8 |
| 10 | 76 | 9 |
| 11 | 93 | 1 |
| 12 | 119 | 1 |
| 13 | 167 | 4 |
| 14 | 279 | 1 |
| 15 | 419 | 0 |

As can be seen from Table 2, there are for most configurations at least one unused preamble. Using only unused cyclic shifts for extra preambles will not cause false detection of random access in neighboring cells and thus do not require a different root sequence planning than for the standard set of preambles.

In one embodiment the additional set of preambles only include preambles generated by unused cyclic shifts. This restricts the possible values of $N_{CS}$ to those with $N_u(N_{CS})>0$ but has the advantage of not requiring re-planning of root sequences.

Although the detailed description above applies to unrestricted sets of cyclic shifts, the invention is applicable also to restricted sets of cyclic shifts.

Figure 6:
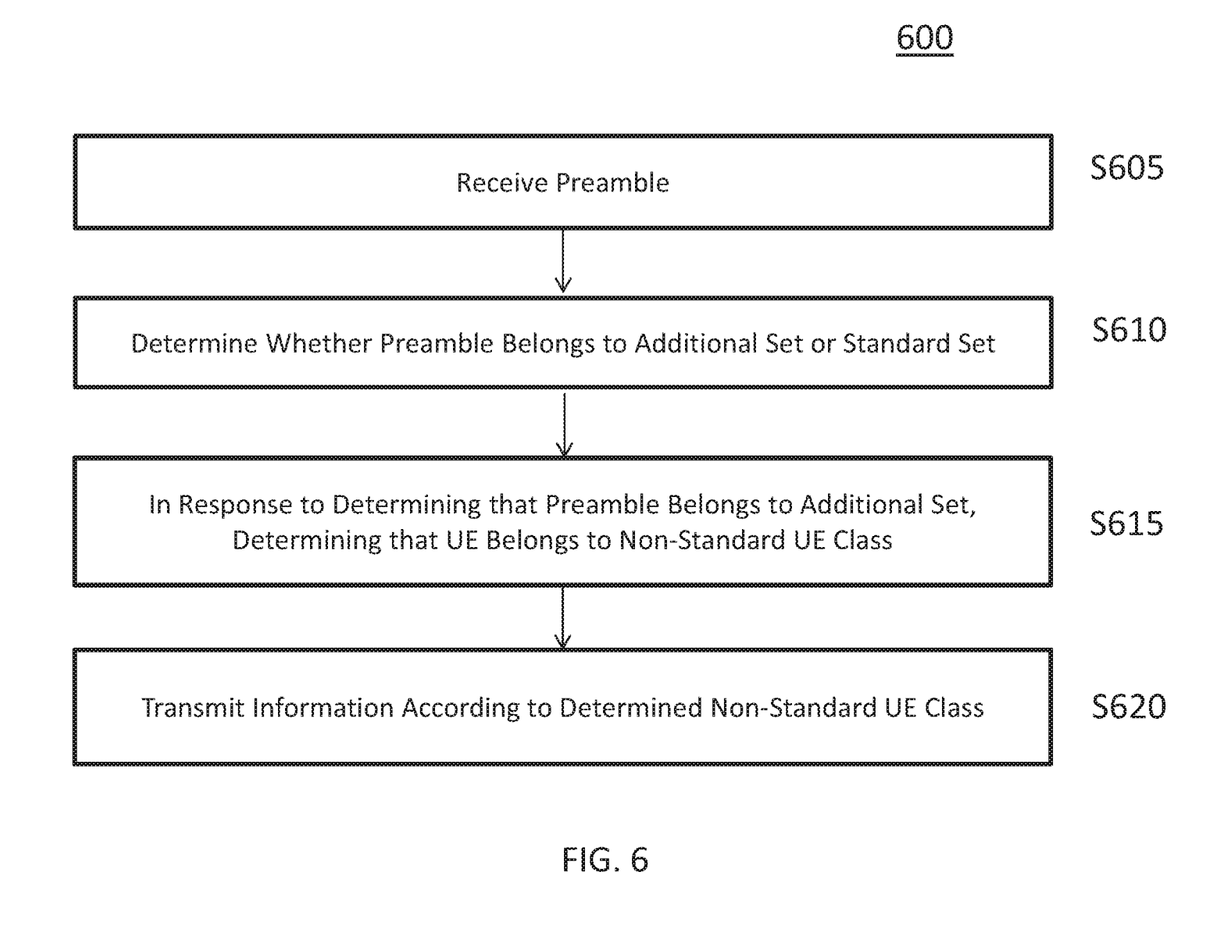
FIG. 6 is a flowchart illustrating a method of operating a radio access node according to an embodiment of the disclosed subject matter.

FIG. 6 is a flowchart illustrating a method of operating a radio access node according to an embodiment of the disclosed subject matter. The method of FIG. 6 could be performed by an apparatus such as that illustrated in FIG. 3, for instance, although it is not limited thereto.

Referring to FIG. 6, the method comprises receiving a random access preamble from a wireless communication device (S605), determining whether the received random access preamble belongs to a standard set of random access preambles or an additional set of random access preambles, wherein the standard set corresponds to at least one standard class of wireless communication device and the additional set corresponds to at least one non-standard class of wireless communication device (S610), and in response to determining that the random access preamble belongs to the additional set of random access preambles, identifying the wireless communication device as belonging to a non-standard class of wireless communication device (S615), and transmitting information to the wireless communication device based on the non-standard class identification (S620).

In certain embodiments, transmitting the information to the wireless communication device comprises transmitting a random access response based on the received random access preamble. In certain embodiments, the standard set and the additional set are generated from a common set of Zadoff-Chu root sequences.

In certain embodiments, determining that the random access preamble belongs to the additional set comprises attempting to detect multiple different random access preambles from the additional set, and in at least one of the attempts, detecting the received random access preamble. The method may further comprise, in response to detecting the received random access preamble, identifying the wireless communication device as belonging to the non-standard class of wireless communication device. The non-standard class of wireless communication device may be, for instance, a reduced-complexity wireless communication device. Such a device may differ from a standard class of wireless communication device in any of several ways, such as having reduced hardware, lower cooling capacity, or lower-capacity battery, among other alternatives.

In certain embodiments, determining that the random access preamble belongs to the additional set comprises evaluating the random access preamble in relation to multiple different additional sets, determining that the random access preamble belongs to a particular one of the multiple different additional sets based on the evaluation, and identifying the wireless communication device as belonging to a particular one of multiple different non-standard classes based on the particular one of the multiple different additional sets.

In certain embodiments, the standard set comprises a number X of random access preambles defined in relation to a number $N_{root}$ of Zadoff-Chu root sequences and a number $N_{pre}$ $$N_{root} = \left\lceil \frac{X}{N_{pre}} \right\rceil,$$

of cyclic shifts per root sequence, wherein and wherein the additional set comprises a number Y of random access preambles defined as $Y = X \bmod N_{pre}$.

In certain embodiments, the standard set comprises 64 random access preambles defined in relation to a number $N_{root}$ of Zadoff-Chu root sequences and a number $N_{pre}$ of cyclic shifts per $$N_{root} = \left\lceil \frac{64}{N_{pre}} \right\rceil,$$

root sequence, wherein and wherein the additional set comprises Y random access preambles defined as $Y = 64 \bmod N_{pre}$.

In certain embodiments, the method further comprises transmitting a root index to the wireless communication device, wherein the received random access preamble is generated by the wireless communication device based on the transmitted root index.

Figure 7:
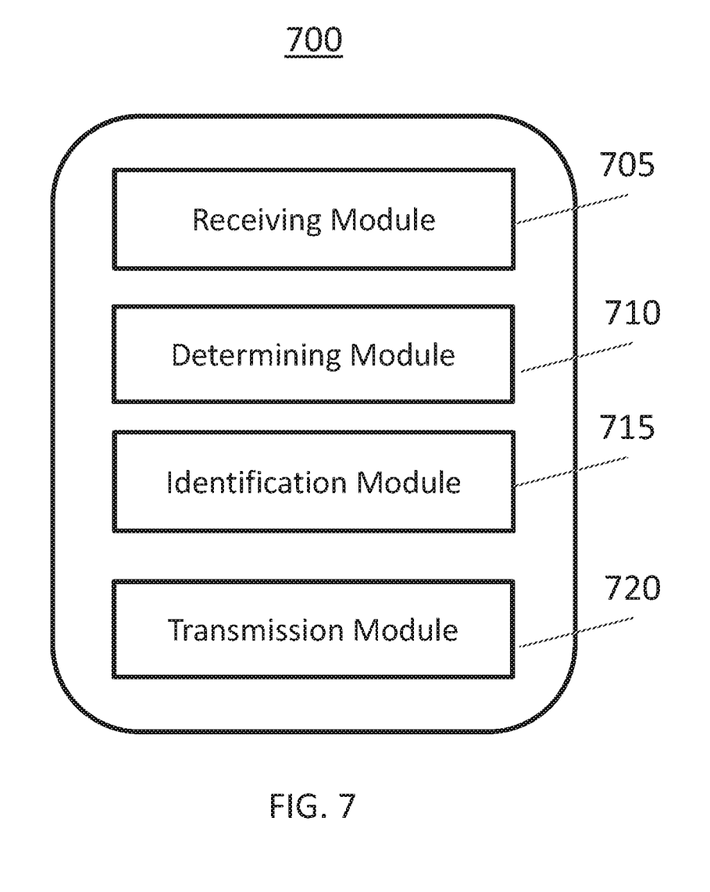
FIG. 7 is a diagram illustrating a radio access node according to an embodiment of the disclosed subject matter.

FIG. 7 is a diagram illustrating a radio access node 700 according to an embodiment of the disclosed subject matter. In the illustrated embodiment, the radio access node comprises a plurality of modules, which may take the form of any suitable combination of hardware and/or software capable of performing the designated functions. For instance, certain modules may be implemented by one or more processors coupled to one or more memories, transmitters, and/or receivers. In general, radio access node 700 may implement functions such as those performed in the method of FIG. 6.

Referring to FIG. 7, radio access node 700 comprises a receiving module 705 configured to receive a random access preamble from a wireless communication device, and a determining module 710 configured to determine whether the received random access preamble belongs to a standard set of random access preambles or an additional set of random access preambles, wherein the standard set corresponds to at least one standard class of wireless communication device and the additional set corresponds to at least one non-standard class of wireless communication device. Radio access node 700 further comprises an identification module 715 configured to, in response to determining that the random access preamble belongs to the additional set of random access preambles, identify the wireless communication device as belonging to a non-standard class of wireless communication device, and a transmission module 720 configured to transmit information to the wireless communication device based on the non-standard class identification.

Figure 8A:
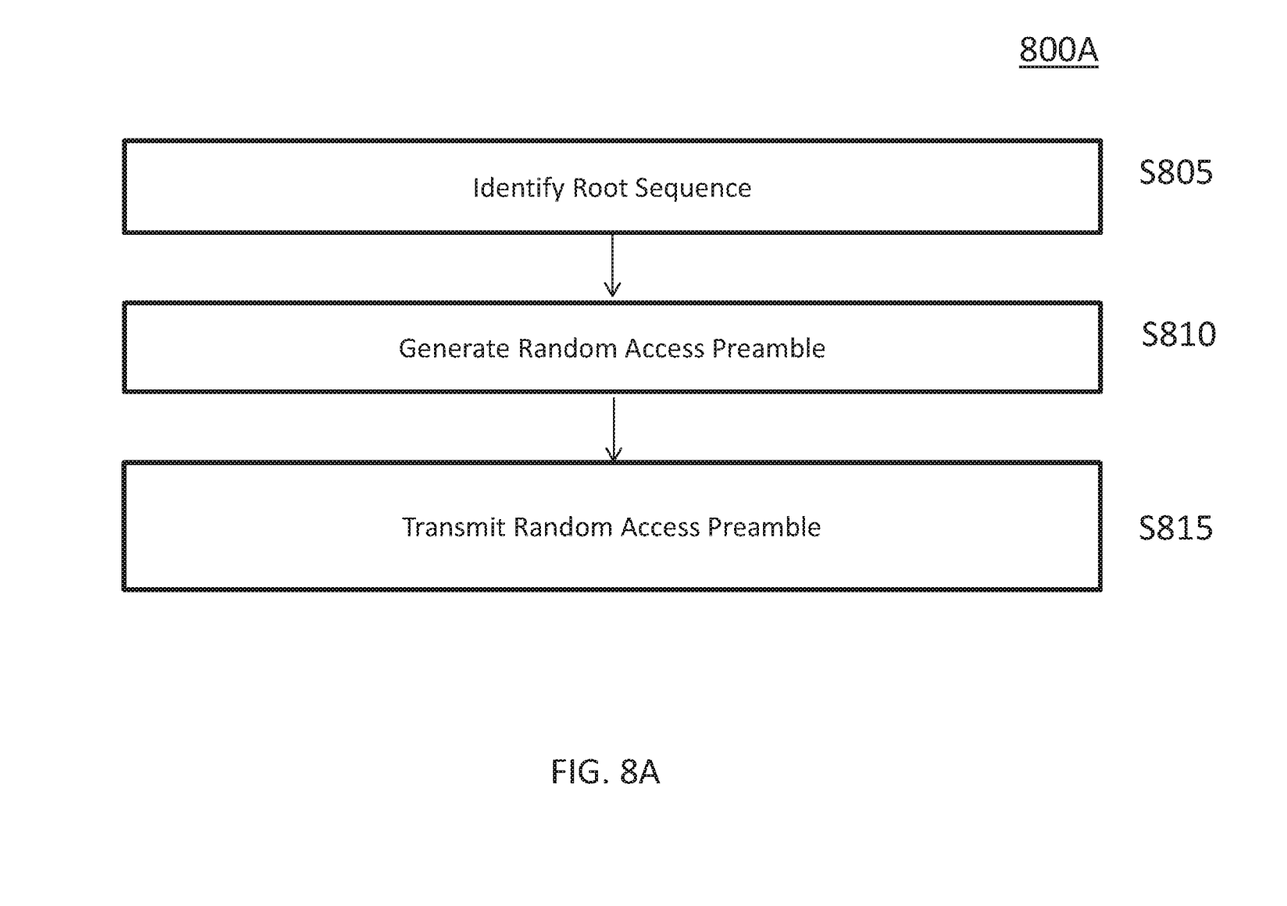
FIG. 8A is a flowchart illustrating a method of operating a wireless communication device according to an embodiment of the disclosed subject matter.
Figure 8B:
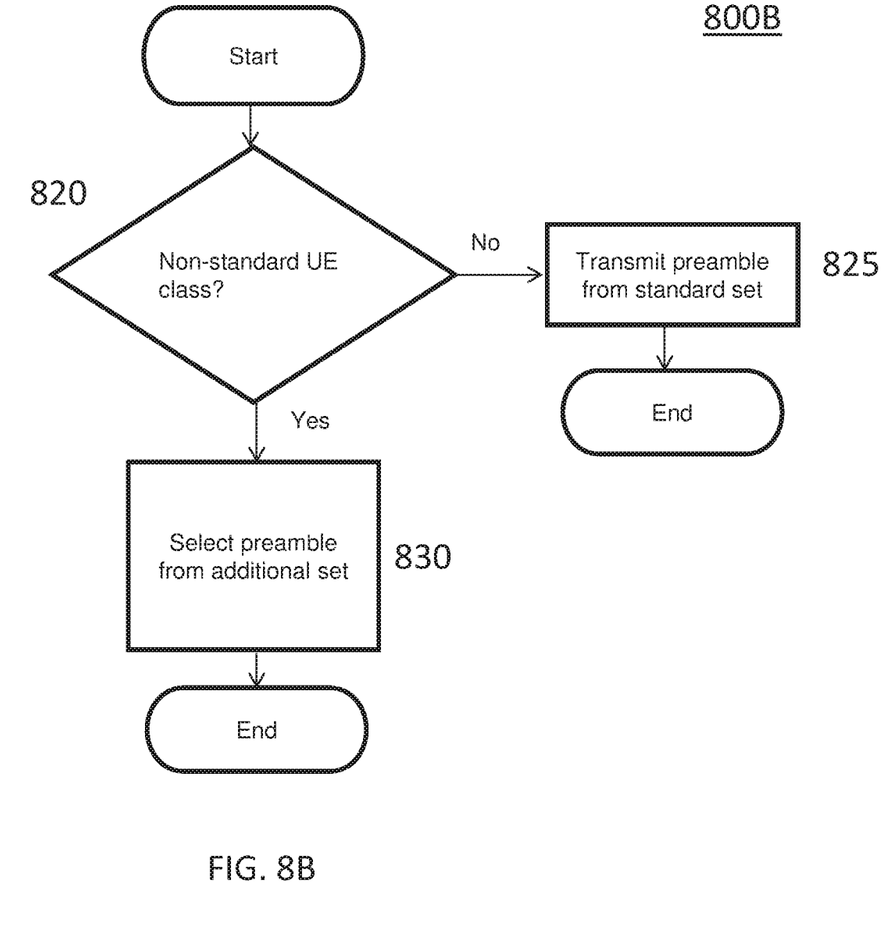
FIG. 8B is a flowchart illustrating a method of operating a wireless communication device according to another embodiment of the disclosed subject matter.

FIGS. 8A and 8B are flowcharts illustrating methods of operating a wireless communication device according to embodiments of the disclosed subject matter. The method of FIG. 8A or 8B could be performed by an apparatus such as that illustrated in FIG. 2, for instance, although it is not limited thereto.

Referring to FIG. 8A, the method comprises identifying at least one root sequence based on information broadcast by a radio access node (S805) and generating a random access preamble based on the at least one root sequence (S810). The random access preamble is selected from an additional set of random access preambles within an extended set of random access preambles, the extended set comprising a standard set of random access preambles that corresponds to at least one standard class of wireless communication device, and further comprising the additional set, which corresponds to at least one non-standard class of wireless communication device, and wherein the standard set and the additional set are both defined in relation to the at least one root sequence. The method further comprises transmitting the random access preamble to the radio access node (S815). In certain embodiments, the at least one root sequence comprises a plurality of Zadoff-Chu root sequences.

In certain embodiments, the non-standard class of wireless communication device is a reduced-complexity wireless communication device.

In certain embodiments, the standard set comprises a number X of random access preambles defined in relation to a number $N_{root}$ of Zadoff-Chu root sequences and a number $N_{pre}$ $$N_{root} = \left\lceil \frac{X}{N_{pre}} \right\rceil,$$

of cyclic shifts per root sequence, wherein and wherein the additional set comprises a number Y of random access preambles defined as $Y=X \bmod N_{pre}$.

In certain embodiments, the standard set comprises 64 random access preambles defined in relation to a number $N_{root}$ of Zadoff-Chu root sequences and a number $N_{pre}$ of cyclic shifts per $$N_{root} = \left\lceil \frac{64}{N_{pre}} \right\rceil,$$

root sequence, wherein and wherein the additional set comprises Y random access preambles defined as $Y=64 \bmod N_{pre}$.

Referring to FIG. 8B, in certain contexts the wireless communication device may have the capability to operate as either a standard UE class or a non-standard UE class. In such circumstances, the wireless communication device may first determine whether to operate as the non-standard UE class (S820). If it determines not to so operate (S820=No), it transmits a random access preamble selected from a standard set (S825). Otherwise (S820=Yes), it transmits a random access preamble selected from an additional set (S830).

Figure 9:
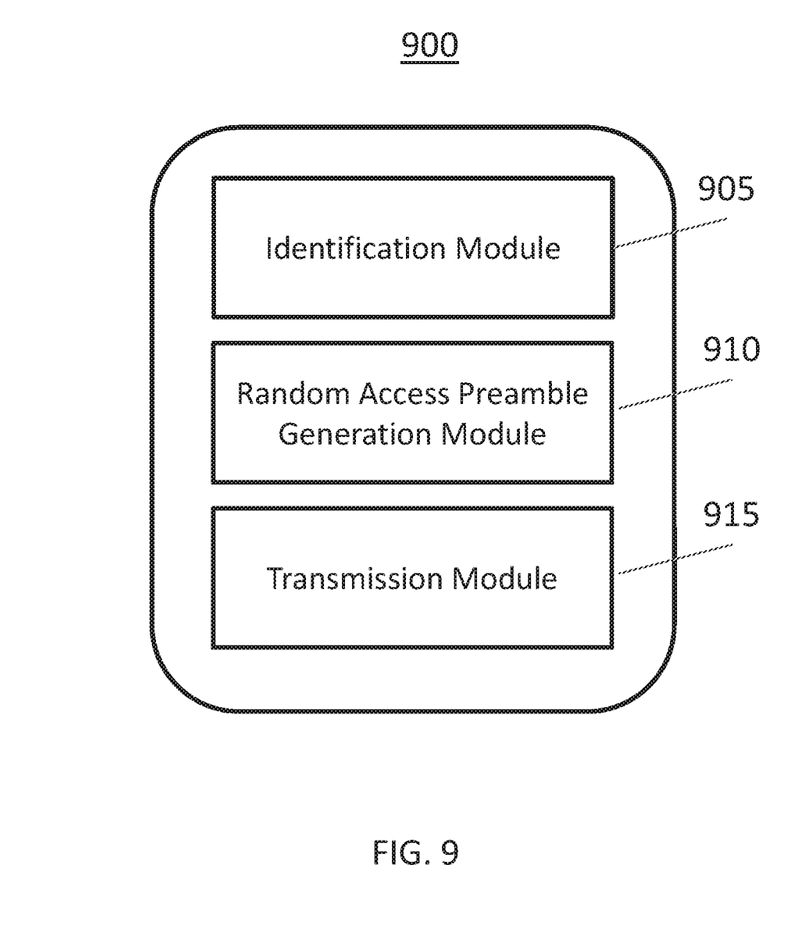
FIG. 9 is a diagram illustrating a wireless communication device according to an embodiment of the disclosed subject matter.

FIG. 9 is a diagram illustrating a wireless communication device 900 according to an embodiment of the disclosed subject matter. In the illustrated embodiment, the wireless communication device comprises a plurality of modules, which may take the form of any suitable combination of hardware and/or software capable of performing the designated functions. For instance, certain modules may be implemented by one or more processors coupled to one or more memories, transmitters, and/or receivers. In general, radio access node 700 may implement functions such as those performed in the method of FIGS. 8A and/or 8B.

Referring to FIG. 9, wireless communication device 900 comprises an identification module 905 configured to identify at least one root sequence based on information broadcast by a radio access node. The information may comprise, for instance, a root index corresponding to the root sequence. Wireless communication device 900 further comprises a preamble generating module 910 configured to generate a random access preamble based on the at least one root sequence. The random access preamble is selected from an additional set of random access preambles within an extended set of random access preambles, the extended set comprising a standard set of random access preambles that corresponds to at least one standard class of wireless communication device, and further comprising the additional set, which corresponds to at least one non-standard class of wireless communication device, and wherein the standard set and the additional set are both defined in relation to the at least one root sequence. Wireless communication device 900 still further comprises a transmission module 915 configured to transmit the random access preamble to the radio access node. Wireless communication device 900 may still further comprise a receiving module configured to receive a random access response from the radio access node, wherein the random access response is responsive to the random access preamble and comprises special treatment in the random access response, such as repetition or power boosting of random access response for increased coverage, or additional content in the random access response, e.g. non-standard MAC Control elements to improve signaling or data transmission.

As indicated by the foregoing, a random access process may be performed with an extended set of random access preambles comprising a standard set and at least one additional set. The use of a preamble from the standard set or the additional set may be used to indicate whether a wireless communication device belongs to a standard class or a non-standard class, allowing a radio access node to provide special treatment to the non-standard class in a random access response.

At least the following abbreviations are used in this description.
E-UTRA Evolved Universal Terrestrial Radio Access
LCD Logical Channel Identity
MAC Medium Access Control
PRACH Physical Random Access Channel
PUSCH Physical Uplink Shared Channel
RRC Radio Resource Control
UE User Equipment While the disclosed subject matter has been presented above with reference to various embodiments, it will be understood that various changes in form and details may be made to the described embodiments without departing from the overall scope of the disclosed subject matter.

The invention claimed is:

1. A method of operating a radio access node, comprising:
    receiving a random access preamble from a wireless communication device;
    determining whether the received random access preamble belongs to a standard set of random access preambles or an additional set of random access preambles, wherein the standard set corresponds to at least one standard class of wireless communication device and the additional set corresponds to at least one non-standard class of wireless communication device; and
    in response to determining that the random access preamble belongs to the additional set of random access preambles, identifying the wireless communication device as belonging to a non-standard class of wireless communication device, and transmitting information to the wireless communication device based on the non-standard class identification,
    wherein the additional set of random access preambles are generated by unused cyclic shifts in a last root sequence used to generate the standard set of random access preambles.

2. The method of claim 1, wherein transmitting the information to the wireless communication device comprises transmitting a random access response based on the received random access preamble.

3. The method of claim 2, further comprising repetition or power boosting of the random access response for increased coverage, or selective inclusion of additional content in the random access response.

4. The method of claim 1, wherein determining whether the random access preamble belongs to the additional set comprises:
attempting to detect multiple different random access preambles from the additional set; and
while attempting to detect multiple different random access preambles from the additional set, detecting the received random access preamble.

5. The method of claim 4, further comprising, in response to detecting the received random access preamble, identifying the wireless communication device as belonging to the non-standard class of wireless communication device.

6. The method of claim 1, wherein the non-standard class of wireless communication device is a reduced-complexity wireless communication device.

7. The method of claim 1, wherein determining that the random access preamble belongs to the additional set comprises evaluating the random access preamble in relation to multiple different additional sets, determining that the random access preamble belongs to a particular one of the multiple different additional sets based on the evaluation, and identifying the wireless communication device as belonging to a particular one of multiple different non-standard classes based on the particular one of the multiple different additional sets.

8. The method of claim 1, wherein the standard set comprises a number X of random access preambles defined in relation to a number $N_{root}$ of Zadoff-Chu root sequences and a number $N_{pre}$ of cyclic shifts per root sequence, wherein $$N_{root} = \left\lceil \frac{X}{N_{pre}} \right\rceil,$$

and wherein the additional set comprises a number Y of random access preambles defined as $Y = X \bmod N_{pre}$.

9. The method of claim 1, wherein the standard set comprises 64 random access preambles defined in relation to a number $N_{root}$ of Zadoff-Chu root sequences and a number $N_{pre}$ of cyclic shifts per root sequence, wherein $$N_{root} = \left\lceil \frac{64}{N_{pre}} \right\rceil,$$

and wherein the additional set comprises Y random access preambles defined as $Y = 64 \bmod N_{pre}$.

10. The method of claim 1, wherein the standard set and the additional set are generated from a common set of Zadoff-Chu root sequences.

11. The method of claim 1, further comprising transmitting a root index to the wireless communication device, wherein the received random access preamble is generated by the wireless communication device based on the transmitted root index.

12. A radio access node, comprising:
at least one memory;
a receiver configured to receive a random access preamble from a wireless communication device;
at least one processor coupled to the at least one memory and configured to:
determine whether the received random access preamble belongs to a standard set of random access preambles or an additional set of random access preambles, wherein the standard set corresponds to at least one standard class of wireless communication device and the additional set corresponds to at least one non-standard class of wireless communication device; and
in response to determining that the random access preamble belongs to the additional set of random access preambles, identify the wireless communication device as belonging to a non-standard class of wireless communication device; and
a transmitter configured to transmit information to the wireless communication device based on the non-standard class identification,
wherein the additional set of random access preambles are generated by unused cyclic shifts in a last root sequence used to generate the standard set of random access preambles.

13. The radio access node of claim 12, wherein transmitting the information to the wireless communication device comprises transmitting a random access response based on the received random access preamble.

14. The radio access node of claim 13, wherein the random access response is repeated or power boosted for increased coverage, or additional content is selectively included in the random access response.

15. The radio access node of claim 12, wherein determining that the random access preamble belongs to the additional set comprises attempting to detect multiple different random access preambles from the additional set, and in at least one of the attempts, detecting the received random access preamble.

16. The radio access node of claim 15, wherein the at least one processor is further configured to, in response to detecting the received random access preamble, identify the wireless communication device as belonging to the non-standard class of wireless communication device.

17. The radio access node of claim 12, wherein the standard set comprises a number X of random access preambles defined in relation to a number $N_{root}$ of Zadoff-Chu root sequences and a number $N_{pre}$ of cyclic shifts per root sequence, wherein $$N_{root} = \left\lceil \frac{X}{N_{pre}} \right\rceil,$$

and wherein the additional set comprises a number Y of random access preambles defined as $Y = X \bmod N_{pre}$.

18. The radio access node of claim 12, wherein the standard set comprises 64 random access preambles defined in relation to a number $N_{root}$ of Zadoff-Chu root sequences and a number $N_{pre}$ of cyclic shifts per root sequence, wherein $$N_{root} = \left\lceil \frac{64}{N_{pre}} \right\rceil,$$

and wherein the additional set comprises Y random access preambles defined as $Y = 64 \bmod N_{pre}$.

19. The radio access node of claim 12, wherein the standard set and the additional set are generated from a common set of Zadoff-Chu root sequences.

20. A wireless communication device, comprising:
a memory;
at least one processor coupled to the memory and configured to:
identify at least one root sequence based on information broadcast by a radio access node; and
generate a random access preamble based on the at least one root sequence, wherein the random access preamble is selected from an additional set of random access preambles within an extended set of random access preambles, the extended set comprising a standard set of random access preambles that corresponds to at least one standard class of wireless communication device, and further comprising the additional set, which corresponds to at least one non-standard class of wireless communication device, and wherein the standard set and the additional set are both defined in relation to the at least one root sequence; and
a transmitter configured to transmit the random access preamble to the radio access node,
wherein the additional set of random access preambles are generated by unused cyclic shifts in a last root sequence used to generate the standard set of random access preambles.

21. The wireless communication device of claim 20, further comprising a receiver configured to receive a random access response from the radio access node, wherein the random access response is responsive to the random access preamble and the random access response is repeated or power boosted for increased coverage, or additional content is selectively included in the random access response.

22. The wireless communication device of claim 20, wherein the non-standard class of wireless communication device is a reduced-complexity wireless communication device.

23. The wireless communication device of claim 20, wherein the standard set comprises a number X of random access preambles defined in relation to a number $N_{root}$ of Zadoff-Chu root sequences and a number $N_{pre}$ of cyclic shifts per root sequence, wherein $$N_{root} = \left\lceil \frac{X}{N_{pre}} \right\rceil,$$

and wherein the additional set comprises a number Y of random access preambles defined as Y=X mod $N_{pre}$.

24. The wireless communication device of claim 20, wherein the standard set comprises 64 random access preambles defined in relation to a number $N_{root}$ of Zadoff-Chu root sequences and a number $N_{pre}$ of cyclic shifts per root sequence, wherein $$N_{root} = \left\lceil \frac{64}{N_{pre}} \right\rceil,$$

and wherein the additional set comprises Y random access preambles defined as Y=64 mod $N_p$re.

25. The wireless communication device of claim 20, wherein the at least one root sequence comprises a plurality of Zadoff-Chu root sequences.

* * * * *